United States Patent [19]
Luhleich et al.

[11] 4,060,592
[45] Nov. 29, 1977

[54] METHOD OF MAKING SHAPED CARBONACEOUS BODIES

[75] Inventors: Hartmut Luhleich, Duren; Hubertus Nickel, Julich-Koslar; Francesco Dias, Julich, all of Germany

[73] Assignee: Kernforschungsanlage Julich GmbH, Julich, Germany

[21] Appl. No.: 578,192

[22] Filed: May 16, 1975

Related U.S. Application Data

[63] Continuation-in-part of Ser. No. 267,479, June 29, 1972, Pat. No. 3,927,187.

[30] Foreign Application Priority Data

July 2, 1971  Germany .............................. 2133044

[51] Int. Cl.² ...................... C01B 31/02; C01B 31/04
[52] U.S. Cl. ................................... 423/448; 264/29.1; 423/449
[58] Field of Search .................. 423/448, 449, 445; 264/29, 69, 105, 29.1; 106/56, 281; 260/48

[56] References Cited

U.S. PATENT DOCUMENTS

| | | | |
|---|---|---|---|
| 1,037,901 | 9/1912 | Hansen | 264/29 |
| 1,891,979 | 12/1932 | Hanauer | 106/56 |
| 2,709,660 | 5/1955 | Larson et al. | 106/56 |
| 2,870,031 | 1/1959 | Benziger | 106/56 |
| 3,084,394 | 4/1963 | Bickerdike et al. | 264/29 |
| 3,346,678 | 10/1967 | Ohlgren | 264/29 |
| 3,634,569 | 1/1972 | Emanuelson et al. | 264/105 |

*Primary Examiner*—Edward J. Meros
*Attorney, Agent, or Firm*—Karl F. Ross

[57] ABSTRACT

Shaped graphitic or graphite-like carbonaceous bodies are produced by forming binder-coated particles of a carbonaceous filler in a slurry, shaping the slurry or paste of the particles to the desired configuration, drying and cokefying the shaped body. The system is suitable for the production of graphitic structures for use in high-temperature gas-cooled nuclear reactors, as casting molds and the like. The present invention starts with the assumption that binder-coated filler particles are available, the particles having been coated uniformly (e.g. as described in our application Ser. No. 267,480).

2 Claims, 1 Drawing Figure

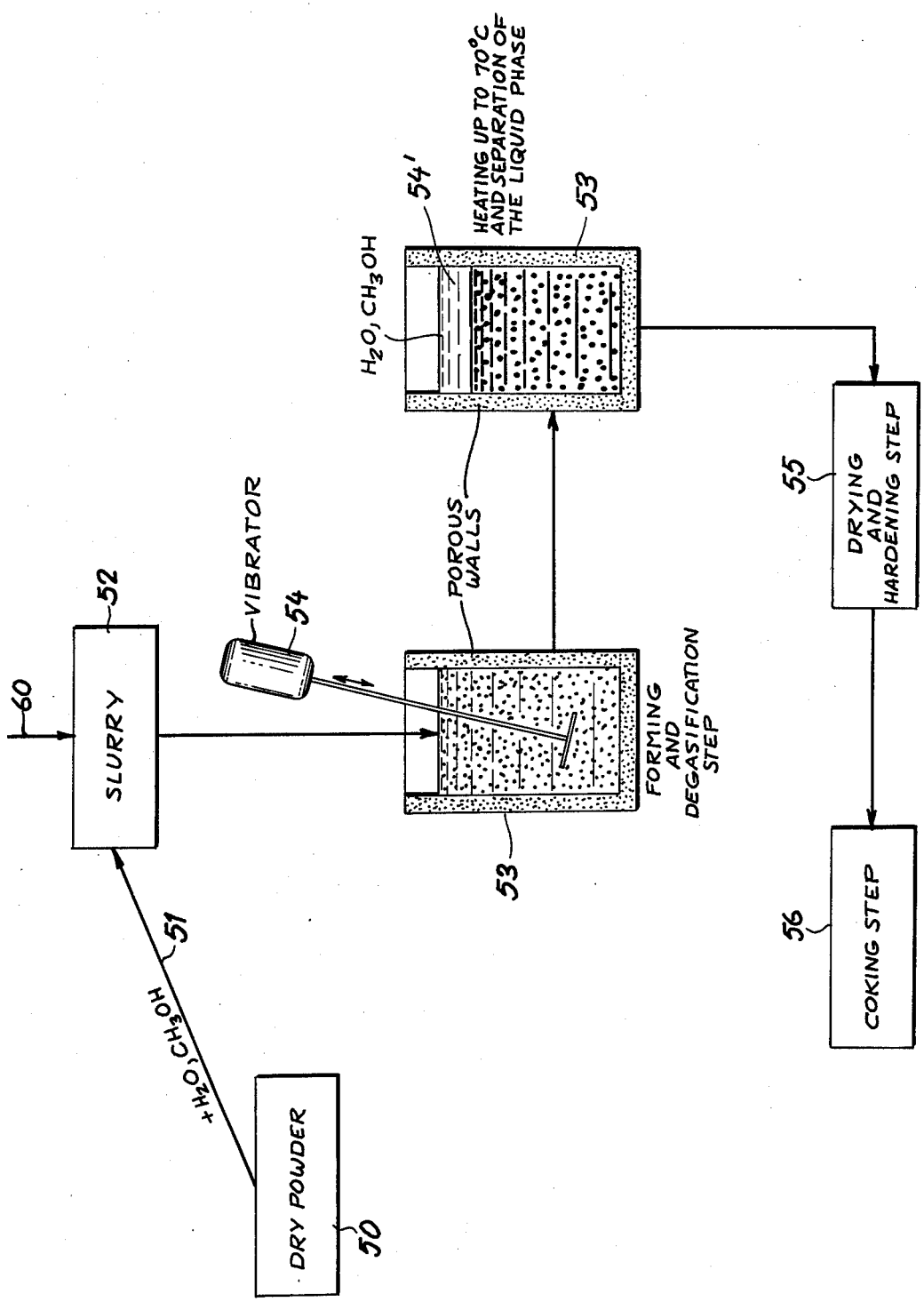

METHOD OF MAKING SHAPED CARBONACEOUS BODIES

CROSS-REFERENCE TO RELATED APPLICATIONS

This application is a continuation-in-part of application Ser. No. 267,479 filed June 29, 1972, now U.S. Pat. No. 3,927,187.

This aplication is also related to application Ser. No. 267,480 filed June 29, 1972, now U.S. Pat. No. 4,009,143.

FIELD OF THE INVENTION

Our present invention relates to a method of producing without pressure shaped carbonaceous bodies and, more particularly, to the production without pressure of graphitic or graphite-like bodies (synthetic-graphite bodies) having good mechanical properties at relatively low cost, said bodies consisting of binder-coated filler particles.

BACKGROUND OF THE INVENTION

In the art of forming carbonaceous bodies, it is frequently desirable to use carbonaceous materials which may be waste products or byproducts of other processes as a source of graphitic carbon although the carbonaceous material may be in an amorphous or nongraphitic state. For example, petroleum coke, carbon black and even electro graphite or natural graphite are desirable sources of graphitic material for the production of shaped graphite or graphite-like bodies.

Graphite bodies have been employed heretofore for many purposes and in various industries. For example, high-temperature gas-cooled nuclear reactors may make use of graphitic bodies for the structure of the nuclear-reactor core, as sheaths for nuclear-fuel elements, as enclosures for fertile elements in breeder reactions, and as components of nuclear fuel or breeder particles. In the metallurgical industry and in the glass-making field, graphite molds or molds lined with graphite or graphite-like materials are used for casting. In general, graphitic bodies have been employed whenever high-temperature processes may be involved because they have a refractory and generally inert character. In nuclear reactors especially, they have proved to be desirable because of the neutron cross-section of graphitic materials and their reduced tendency to produce reaction products which interfere with the operation of a nuclear reactor.

Common methods of producing graphite-like bodies involve the extrusion of ram-pressing of synthetic graphite or graphite-like products to shape them into the desired configuration. These systems frequently require after-treatment of the graphite-like bodies and make use of relatively expensive equipment because it has been difficult heretofore to impart a well-defined shape to the graphitic materials and at the same time provide high compressive strength and other desirable mechanical properties.

OBJECTS OF THE INVENTION

It is, therefore, the principal object of the present invention to provide a method of making shaped bodies of synthetic graphite or materials similar to synthetic graphite, i.e., to produce graphite-like bodies, whereby the disadvantages of earlier systems can be avoided and without using pressure relatively intricate bodies can be made with good mechanical characteristics at relatively low cost.

It is another object of the invention to provide an improved method of making graphite-like bodies of uniform or homogeneous cross-section, highly compressive strength and complex configuration without the disadvantages of ram-press systems as described above.

Yet another object of the invention is to provide a method of making shaped carbonaceous, especially graphite-like bodies for use in nuclear reactors and as casting molds, without the use of pressure and with high structural strength.

It is also an object to advance the principles set forth in the above-mentioned applications.

SUMMARY OF THE INVENTION

These objects and others which will become apparent hereinafter are attained, in accordance with the present invention, in a system for producing graphite-like bodies (synthetic-graphite bodies) which comprises the steps of forming a viscous slurry of particles in a liquid medium, e.g. as a flowable or kneadable mass, shaping this mass to the desired configuration, drying the mass and thereafter cokefying the mass, the solids of which consist of particles of a carbonaceous filler coated with a carbonizable binder. The present invention starts with the assumption that binder-coated filler particles are available, the particles having been coated uniformly (e.g. as described in our application Ser. No. 267,480 now U.S. Pat. No. 4,009,143).

According to a feature of the invention, the proportion of the liquid (solvent) in which the binder is soluble and which is miscible with the slurrying liquid, should be between 5 and 20% by volume of the liquid mixture.

During drying, the mass, which is preferably shaped in a mold, produces a solid "green" body which, upon cokefying at temperatures of 800° C and above, yields a homogeneous rigid structure of the configuration originally imparted to the shapable mass. The latter can be employed as a more or less flowable or viscous product which may be sufficiently fluid to be cast or may be somewhat more pasty so as to be shapable by manipulative molding or kneading as in the case of clay.

According to another feature of the invention, the mass includes a liquid phase in which the binder is only limitably soluble and swellable, the liquid phase, e.g. water, serves as a vehicle for shaping the particulate mass. Advantageously, the powder is obtained by drying the slurry of a binder and the aforementioned filler solids as described above.

Still another feature of the invention resides in the treatment of the powder after it has been shaped, e.g. in the mold, with vapor of a boiling liquid comprising a solvent in which the binder is completely or partially soluble, whereupon the shaped body is dried and cokefied in the manner described. The powder is, in this case as well, produced by drying the binder/solids slurry mentioned earlier. The body may have an especially high density if the powder, before treatment with vapor is densified by vibration in the mold. The vapor should consist 10 to 80% by volume of vapor of the binder-solublizing solvent. Best results are obtained when the binder-solublizing solvent in the vapor is present in an amount of 25%.

Preferably the filler materials, such as electrically-produced synthetic graphite, natural graphite, milled petroleum coke and carbon black are mixed with binders such as pitch, tar and phenol-formaldehyde resins by dissolving the binder first in a liquid in which the filler is slurried and then introducing this produced slurry into a carrier liquid in which the binder is insoluble or only partly soluble to produce an emulsion of the binder in the form of the coating upon the solid particles which settle and, after decanting of the excess liquid, form a slurry as described in the commonly assigned copending application Ser. No. 267,480 filed June 29, 1972 (now U.S. Pat. No. 4,009,143) in which we are coinventors, to produce particles in which the solid grains are substantially uniformly coated with the binder, the starting point of the present invention.

The shaped bodies produced in accordance with the present invention have an exceptionally high degree of homogeneity.

Another advantage of the process according to the present invention is that nearly the whole porosity of the finished body is open and thus the body is suitable as an impregnatable structure for any purpose in which impregnation is desired. For example, it may be desirable to impregnate the body with conductive substances in order to increase the electrical conductivity, synthetic graphite bodies prepared with binders being notoriously of poor conductivity.

It is important to note, in accordance with this invention, that the system obtains bodies of relatively high density and strength without the application of any pressure other than the self-packing or gravitational pressure resulting when the slurry is filled into a mold.

We have now found that it is not necessary to press the particles into shape in an extrusion press, with rams or the like in order to obtain bodies of high density and high structural strength. Rather, the present invention teaches that it is possible to provide shaped bodies from such coated particles in a simple and economical way when the coated particles are slurried and are introduced as a wet or moist mass, as a slurry, into forms or molds and only then dried. It is indeed surprising that the slurrying of the particles into the mold, without application of pressure, can give rise to bodies which upon cokefication, form bodies equal to those produced under elevated pressures.

According to a feature of the invention, the proportion of the liquid in which the binder is soluble and which is miscible with the slurrying liquid should be between 5 and 20% by volume of the liquid mixture.

DESCRIPTION OF THE DRAWING

The above and other objects, features and advantages of the present invention will become more readily apparent from the following description, reference being made to the accompanying drawing in which the sole FIGURE is a flow diagram illustrating a process according to the present invention.

SPECIFIC DESCRIPTION

In a slurry receptacle 52, which is selectively supplied with a slurry through a line 60 from a process corresponding to that described in application Ser. No. 267,480, (U.S. Pat. 4,009,143) or a slurry from a vessel 50 via line 51 in which a dry bindercoated powder is mixed with a liquid containing a solvent in which the binder is partially soluble, the slurry is introduced into a porous-wall form 53.

Preferably the liquid phase of the slurry is water containing 5 to 20 volume percent methanol. In the form 53, the slurry is settled by a vibrator 54, the excess liquid draining through the walls or being decanted, the contents of the mold being then degassed by heating it to a temperature of 70° C.

As represented at 54' the liquid phase is removed and the mold or form containing the particles from which the liquid has been removed is introduced into a drying and hardening oven 55 and then introduced into a furnace 56 where coking occurs as described in CARBON AND GRAPHITE HANDBOOK, CHAS. L. MANTELL, INTERSCIENCE PUBLISHERS, NEW YORK 1968. The product is removed from the mold and constitutes the desired graphitic body.

SPECIFIC EXAMPLE

75 Grams of a dry powder produced by a method described in application Ser. No. 267,480 (now U.S. Pat. No. 4,009,143) are made into a pasty mass by the addition of 15 volume percent of methanol containing water. The paste is thoroughly blended and shaped in a mold having walls permeable to gas without pressure and thereafter the mold is heated to 70° C. In the mold the mass is setting up from the liquid phase and the body in the mold is then dried at about 105° C and is then coked at a temperature above 800° C. Cokefication is completed when the volatile components of heating of the phenol-formaldehyde resin are no longer given off. (Cokefication was carried out as described in Carbon and Graphite Handbook, Charles L. Mantell, Interscience Publishers, New York, 1968). The body is found to have a homogeneous structure, high mechanical strength and faithful conformity to the mold.

We claim:
1. A method of making a graphitic body from carbonaceous filler particles selected from the group which consists of petroleum coke, electrographite, natural graphite and carbon black, coated with a binder selected from the group which consists of phenol-formaldehyde resin, pitch and tar, comprising the steps of:
   a. forming a paste or slurry of the binder-coated filler particles in a carrier liquid containing 5% to 20% by volume of a solvent for said binder, said binder being at most slightly soluble in said liquid;
   b. introducing said paste or slurry into a mold wherein said paste or slurry is shaped without the application of pressure;
   c. drying the paste in said mold to form a shaped body therein; and
   d. cokefying said body.
2. The method defined in claim 1 wherein said binder is a phenol-formaldehyde resin, said solvent is methanol and said liquid is water, said paste or slurry being dried at a temperature of about 105° C to form said body, said body being cokefied at a temperature above 800° C.

* * * * *